(12) United States Patent
Klinker

(10) Patent No.: US 7,447,798 B2
(45) Date of Patent: Nov. 4, 2008

(54) METHODS AND SYSTEMS FOR PROVIDING DYNAMIC DOMAIN NAME SYSTEM FOR INBOUND ROUTE CONTROL

(75) Inventor: Eric Klinker, Oakland, CA (US)

(73) Assignee: Internap Network Services Corporation, Atlanta, GA (US)

( * ) Notice: Subject to any disclaimer, the term of this patent is extended or adjusted under 35 U.S.C. 154(b) by 789 days.

(21) Appl. No.: 10/774,445

(22) Filed: Feb. 10, 2004

(65) Prior Publication Data

US 2004/0249971 A1    Dec. 9, 2004

Related U.S. Application Data

(60) Provisional application No. 60/446,424, filed on Feb. 10, 2003, provisional application No. 60/446,490, filed on Feb. 10, 2003, provisional application No. 60/446,624, filed on Feb. 10, 2003, provisional application No. 60/446,696, filed on Feb. 10, 2003.

(51) Int. Cl.
    *G06F 15/173* (2006.01)
(52) U.S. Cl. ...................................... 709/240
(58) Field of Classification Search ................ 709/238, 709/240
    See application file for complete search history.

(56) References Cited

U.S. PATENT DOCUMENTS

| | | | |
|---|---|---|---|
| 5,884,043 A * | 3/1999 | Teplitsky ................. | 709/238 |
| 6,189,044 B1 * | 2/2001 | Thomson et al. ........... | 709/242 |
| 6,298,304 B1 * | 10/2001 | Theimer .................. | 701/210 |
| 6,370,119 B1 * | 4/2002 | Basso et al. ............. | 370/252 |
| 6,646,989 B1 * | 11/2003 | Khotimsky et al. ........ | 379/238 |
| 6,697,335 B1 * | 2/2004 | Ergun et al. ............. | 370/238 |
| 6,898,436 B2 * | 5/2005 | Crockett et al. .......... | 455/518 |
| 6,898,515 B2 * | 5/2005 | Kim et al. ............... | 701/201 |
| 7,020,087 B2 * | 3/2006 | Steinberg et al. ......... | 370/238 |
| 7,111,163 B1 * | 9/2006 | Haney .................... | 713/153 |
| 7,222,190 B2 * | 5/2007 | Klinker et al. ........... | 709/238 |
| 7,269,157 B2 | 9/2007 | Klinker et al. | |
| 2003/0088529 A1 | 5/2003 | Chou | |
| 2004/0059830 A1 | 3/2004 | Turner | |
| 2006/0182034 A1 | 8/2006 | Jean | |

* cited by examiner

*Primary Examiner*—David Y Eng
(74) *Attorney, Agent, or Firm*—Kilpatrick Stockton LLP

(57) ABSTRACT

The present invention relates to methods and systems for providing dynamic domain name system (DNS) for inbound route control. For instance, the present invention provides a method that considers load data for each of the network locations that provide an application, such online content or a web site available at multiple geographically distinct data centers, as well as performance data for paths through the various network service providers that serve the locations where the application is available. The IP address that is delivered by the DNS is dynamically controlled to select which IP address, i.e., provider, provides the best path.

14 Claims, 24 Drawing Sheets

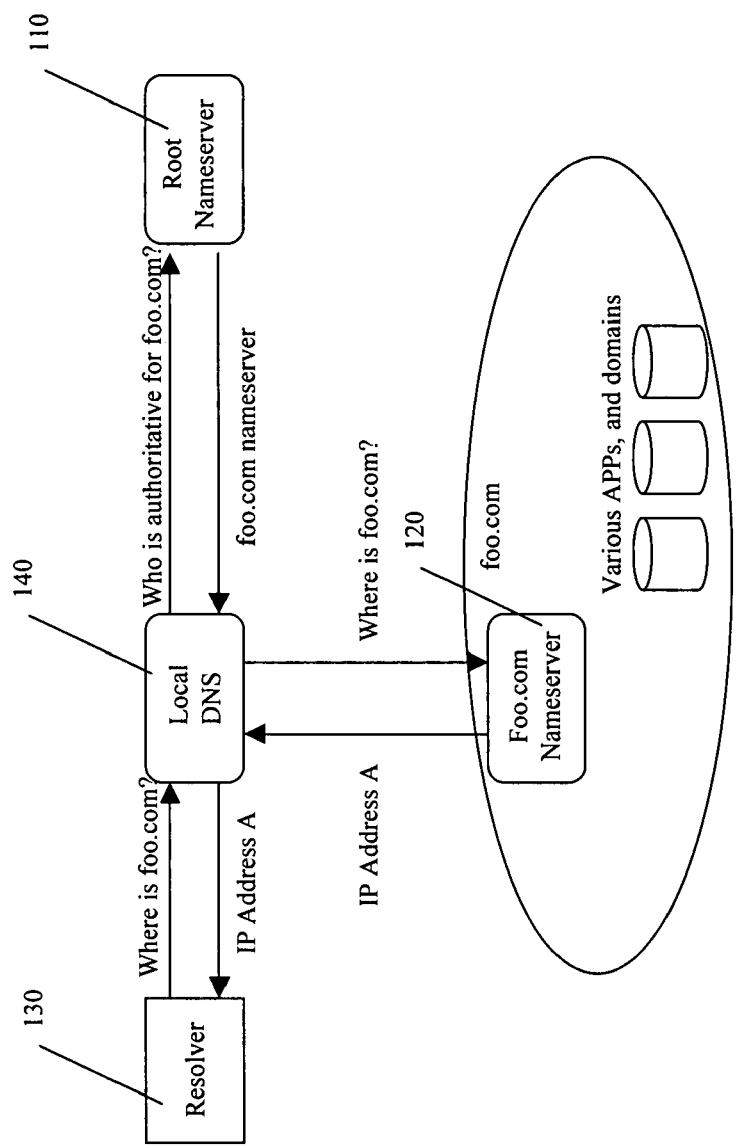
FIG. 1 – Prior Art

METHODS AND SYSTEMS FOR PROVIDING DYNAMIC DOMAIN NAME SYSTEM FOR INBOUND ROUTE CONTROL

PRIORITY

This application claims priority to the following U.S. Provisional patent applications:

No. 60/446,424 filed Feb. 10, 2003, and entitled "FCP ARCHITECTURE FOR DYNAMIC DNS;"

No. 60/446,490, filed Feb. 10, 2003, and entitled "DYNAMIC DNS-BASED INBOUND CONTROL;"

No. 60/446,624 filed Feb. 10, 2003, and entitled "BUILDING CLIENT TO LOCAL DNS ASSOCIATIONS FOR DYNAMIC CONTROL;" and No. 60/446,696 filed Feb. 10, 2003, and entitled "DYNAMIC DNS CONTROL REQUIREMENTS."

The aforementioned U.S. provisional patent applications are herein incorporated by reference in all their entireties.

CROSS-REFERENCES

This application relates to the following U.S. patent applications:

Utility application Ser. No. 09/833,219 filed Apr. 10, 2001, issued as U.S. Pat. No. 7,269,157 and entitled "SYSTEM AND METHOD TO ASSURE NETWORK SERVICE LEVELS WITH INTELLIGENT ROUTING";

Utility application Ser. No. 10/286,576 filed Nov. 1, 2002, and entitled "DATA NETWORK CONTROLLER"; and Utility application Ser. No. 10/735,589 filed Dec. 12, 2003, and entitled "TOPOLOGY AWARE ROUTE CONTROL".

Provisional Application No. 60/411,404 filed Sep. 17, 2002, entitled "INTERNET ADDRESS SPACE CLUSTERING FOR INTELLIGENT ROUTE CONTROL";

Utility application No. 10/662,108 filed Sep. 12, 2003.

The aforementioned U.S. patent applications are also herein incorporated by reference in all their entireties.

BACKGROUND OF THE INVENTION

1. Field of the Invention

The present invention relates generally to methods and systems for routing accesses to online content. For example, embodiments of the present invention relate generally to methods and systems for establishing inbound route control via dynamic Domain Name System (DNS).

2. Background

In the current digital information age, data networks such as the Internet increasingly have been used as means of communication between businesses and consumers. On the Internet, businesses can set up web sites to share and deliver content (e.g., information, data, and other resources) to consumers and other clients or site users. Because content sharing and delivery are mission-critical activities to many businesses, route control for effectively performing such activities on the Internet is essential to the continuity of operations of those businesses.

Currently, there are two approaches to route control for handling how clients reach a desired online content or web site: 1) change the way the IP address is advertised to the Internet using electronic Border Gateway Control (eBGP); and 2) change the IP address the Domain Name System (DNS) resolves to match a previous advertisement. There are drawbacks to both approaches. In the first approach, modifications to eBGP are disruptive to the Internet routing system, take a very long time to converge, and affect every destination on the Internet. Therefore, such a technique cannot be used to address individual performance problems specific to a portion of the Internet.

In the second approach, changing the DNS forces the client or site user to resolve an Internet Protocol (IP) address that will arrive on a predetermined provider. As known in the art, the DNS is the portion of the Internet infrastructure responsible for resolving site names (e.g., internap.com, uspto.gov, etc.) to IP addresses. Thus, the DNS is the primary means of locating content on the internet, wherein users initiate requests for transactions based on the resolved IP addresses. However, performance bottlenecks have emerged over time, limiting the usefulness and efficiency of the Internet infrastructure for sharing and delivering content critical to business continuity. These bottlenecks typically occur at distinct places along the many network routes to a destination (i.e., web site) from a source (i.e., a user), for example. However, if a business is multi-homed, i.e., the business relies on more than one Internet or network service provider (ISP or NSP) to access the Internet, more than one path or route is available to reach the business. Therefore, it is possible to determine and control which of the available inbound paths a client/user will take to the business web site when conducting a transaction to alleviate the bottlenecks, balance provider load, or minimize provider cost. For instance, consider a large content site with two providers A and B. By splitting the local IP address space (or using the multiple-provider IP address space) of the content site and advertising that address space out each provider independently, inbound requests will adhere to those advertisements. Therefore, requests bound for an IP address advertised out a provider A will transit through provider A, and requests bound for an address advertised out a provider B will transit through provider B. Likewise, a request bound for an IP address issued by provider A itself (as opposed to locally-owned address space) will arrive on provider A, and a request bound for an IP address issued by provider B itself (as opposed to locally-owned address space) will arrive on provider B.

Although external routing advertisements for a particular IP address determine how all traffic reaches a designated online content or web site, performance problems on each the inbound path to the online content or web site may prevent requests from ever reaching the site. Further, while factors such as the kind of DNS, DNS load balancing, caching, and content distribution system being used can influence the DNS process, such factors have not been incorporated into route control to address the performance problems on the inbound paths. Consequently, one of the primary shortcomings of route control today is the inability of a business to affect or influence inbound control, i.e., the way its content is accessed by outside users such as consumers and other clients.

SUMMARY OF THE INVENTION

Thus, there exists a need for a method and system to use the DNS to influence inbound traffic at a multi-homed enterprise in order to close the gap between existing route control and complete route control and paves the way for a complete business continuity solution.

Accordingly, some exemplary embodiments of the present invention provide methods and systems for controlling the inbound path to an online content or web site or application by dynamically controlling the IP address that is delivered by the DNS in order to select which IP address, i.e., provider, is the best inbound for the user to use to access the site. Thus, inbound access requests from users can arrive at the predetermined provider and combined with outbound route control techniques, "route control" is established in both directions.

Other exemplary embodiments of the present invention provide a method and computer program code for selecting a route in a data network to a destination address space, comprising: receiving traffic information traversing the data network; identifying sources that request access to the destination address space from the traffic information; determining the destination address space is accessible through a plurality of network service providers; measuring inbound traffic performance from each of the identified sources to the destination address space through each of the plurality of network service providers; determining an optimal path associated with each of the sources to access the destination address space via one of the network service providers; and directing each of the identified sources to access the destination address space via one of the network service providers in accordance with the optimal path associated with the source.

The above embodiments are mentioned not to limit or define the invention, but to provide examples of embodiments of the invention to aid understanding thereof. The exemplary embodiments and their advantages, and additional aspects and advantages of the invention, will be set forth in part in the description that follows, and in part will become more apparent to those skilled in the art upon examination of the present disclosure.

BRIEF DESCRIPTION OF THE DRAWINGS

The embodiments of the present invention are illustrated by way of example in, and not limited to, the following figures:

FIG. 5-1 depicts inbound and outbound decision trees for both cost and performance of the DNS controller shown in FIG. 5, in accordance with one embodiment of the present invention;

FIG. 5-2 depicts a performance-based decision flow for inbound control in accordance with an embodiment of the present invention;

FIG. 5-3 depicts an inbound-cost decision flow for inbound control in accordance with an embodiment of the present invention;

FIG. 5-4 depicts simple traffic engineering modes for cost moves in accordance with an embodiment of the present invention;

FIG. 5-5 depicts a sophisticated traffic engineering decision in accordance with an embodiment of the present invention;

FIG. 5-6 depicts a controller architecture for BGP associations in accordance with an embodiment of the present invention;

FIG. 5-7 depicts a BGP association decision in accordance with an embodiment of the present invention;

FIG. 5-8 depicts a controller architecture for "discovery" associations in accordance with an embodiment of the present invention;

FIG. 5-9 depicts a "discovery" association decision flow in accordance with an embodiment of the present invention;

FIG. 5-10 depicts a controller architecture for "scan point" associations in accordance with an embodiment of the present invention;

FIG. 5-11 depicts a "scan point" association decision flow in accordance with an embodiment of the present invention;

FIG. 6 depicts a dynamic DNS configuration in accordance with an embodiment of the present invention;

FIG. 7 depicts an implementation of the advanced DNS name server in accordance with an embodiment of the present invention;

FIG. 8 depicts a dynamic DNS configuration that uses a modified caching forwarder to support a larger business site in accordance with an embodiment of the present invention;

FIG. 9 depicts an example of the route control provided by the dynamic DNS configuration shown in FIG. 8 in accordance with an embodiment of the present invention;

FIG. 10 depicts another example of the route control provided by the dynamic DNS configuration shown in FIG. 8 in accordance with an embodiment of the present invention;

FIG. 11 depicts an exemplary architecture for a dynamic DNS forwarder in accordance with an embodiment of the present invention.

DETAILED DESCRIPTION OF THE INVENTION

Figure 1:
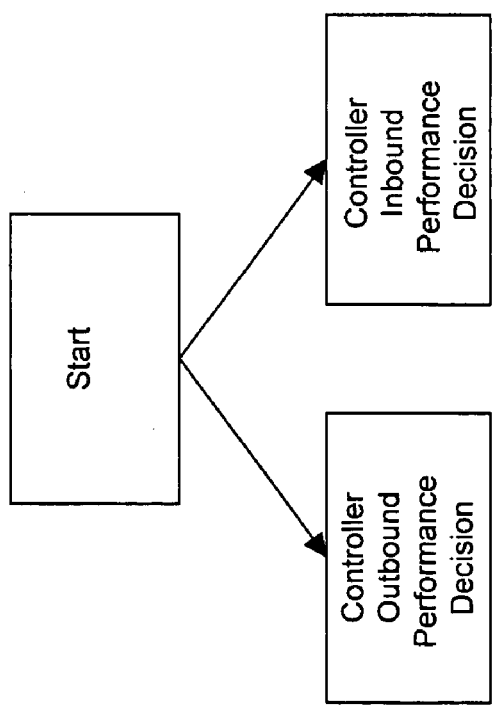
FIG. 1 depicts a typical DNS currently being used in the Internet today.

Before embodiments of the present invention are described, it is useful to review how the Domain Name System (DNS) works in the Internet today. FIG. 1 shows the typical DNS infrastructure which comprises a hierarchy of name servers, each authoritative for a portion of the Internet's domain names. At the top of the hierarchy are a plurality of root name or DNS servers, only one of which is shown as the root name/DNS server 110 for simplicity. The root name server 110 directs requests to child name servers that are authoritative for particular domain names. These child name servers actually respond to access requests from clients/users with IP addresses associated with the requested domain names. For instance, as shown in FIG. 1, a client requests access to a domain, www.foo.com, which is the domain for the child name server 120, namely, the foo.com name server, with an associated IP address. Each client has a piece of software called the resolver 130, as part of the client's web browser, that is installed on the client side and responsible for the initial DNS requests from the client.

If the resolver 130 does not have the IP address locally cached, it sends a DNS request to a local name server or DNS server, shown as L-DNS 140. The L-DNS server 140 is configured as a part of every computer's network settings. If the L-DNS server 140 is authoritative for the domain name or has the results from a previous DNS query cached, it will respond to the client directly. However, if the L-DNS server 140 does not know the IP address, it queries the root DNS server 110 to find the IP address of the remote child name server that is authoritative for the domain name. When the root DNS server 110 responds with the IP address of the remote child name server 120, the L-DNS server 140 sends another DNS query to the remote child name server 120, which then responds with the IP address being requested and the L-DNS server 140 caches the result and forwards such result on to the client. The client then uses that IP address when initiating the connection to www.foo.com to access the content, e.g., various applications and other domains as shown in FIG. 1, at the site.

Every response from a root name server 110 has an associated lifetime, called the time to live (TTL) value. This tells the L-DNS server 140 how long to cache or honor the IP address. If subsequent access requests for the same domain arrive at the L-DNS server 140 and the TTL has not expired, the L-DNS server 140 will respond with the previous IP address value for the requested domain. If the TTL has expired, the L-DNS server 140 will refresh the information by making another request to the root name server 110 as described earlier. Setting the TTL to 0 will force a lookup to happen on every request and prevent any information from being cached. As described later, in the context of inbound DNS based route control of the present invention, setting the TTL to 0 allows any new control decision to take effect immediately.

There are some other common components of a typical DNS configuration not shown in FIG. 1. At the top of a large domain there may reside another component, the caching DNS forwarder (not shown). The forwarder is a server which is listed as authoritative for the domain; however, it simply forwards all DNS requests to other DNS servers within the domain (e.g., if there are more than one child name server 120 at foo.com). Those servers return the answer back to the forwarder which caches the result and sends it along to the L-DNS server 140 that made the initial request. These forwarders can be easily added on top of existing DNS configurations and provide a convenient place to inspect the DNS response as it is passed back to the original requester.

The DNS is one of the oldest elements of the Internet (dating back to the late 80's) and there have been many extensions and unique uses developed for the protocol. Many large content sites have geographically dispersed data centers that share a common domain name (like cnn.com). Therefore, DNS has been used to dynamically offer up the IP address of the data center that appears to be closest to the client making the request. The DNS is also used to implement a type of server and data center load balancing. When the servers at a particular location are starting to become overwhelmed with requests, new DNS requests resolve to other server locations where the current server load is lower. Caching and content distribution networks are further examples that use and modify the DNS to accomplish a particular function, generally to make the content more accessible to the user. Such applications are known and understood in the art and will not be further described herein. However, it should be noted that all of these applications play a crucial role in today's content deployments, and any solution that implements inbound DNS based route control must not interfere with these existing applications.

Reference is now made in detail to embodiments of the present invention, some examples of which are illustrated in the accompanying drawings, showing a method and system for providing dynamic DNS inbound control.

Figure 2:
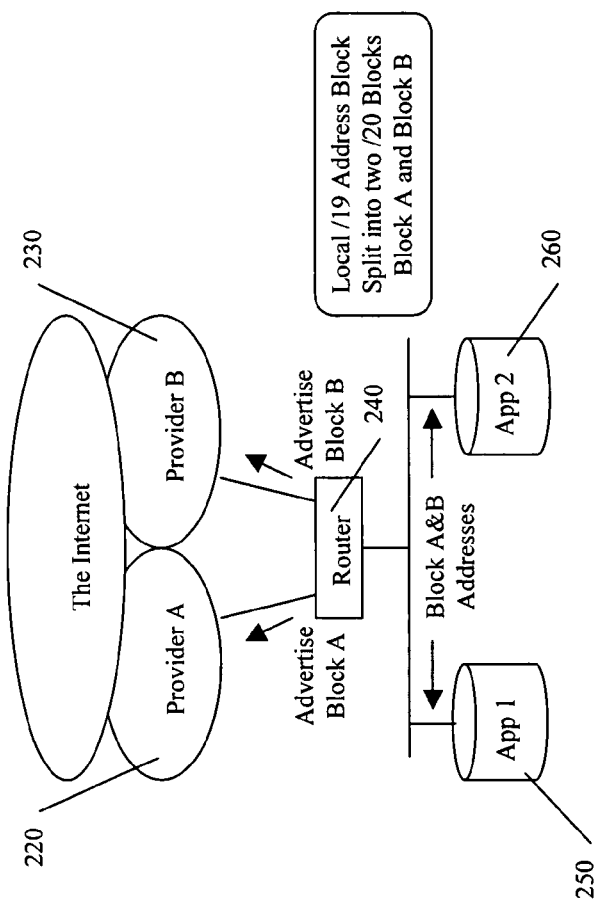
FIG. 2 depicts a general dynamic DNS configuration for a multi-homed business or enterprise in accordance with the embodiments of the present invention.
Figure 3A:
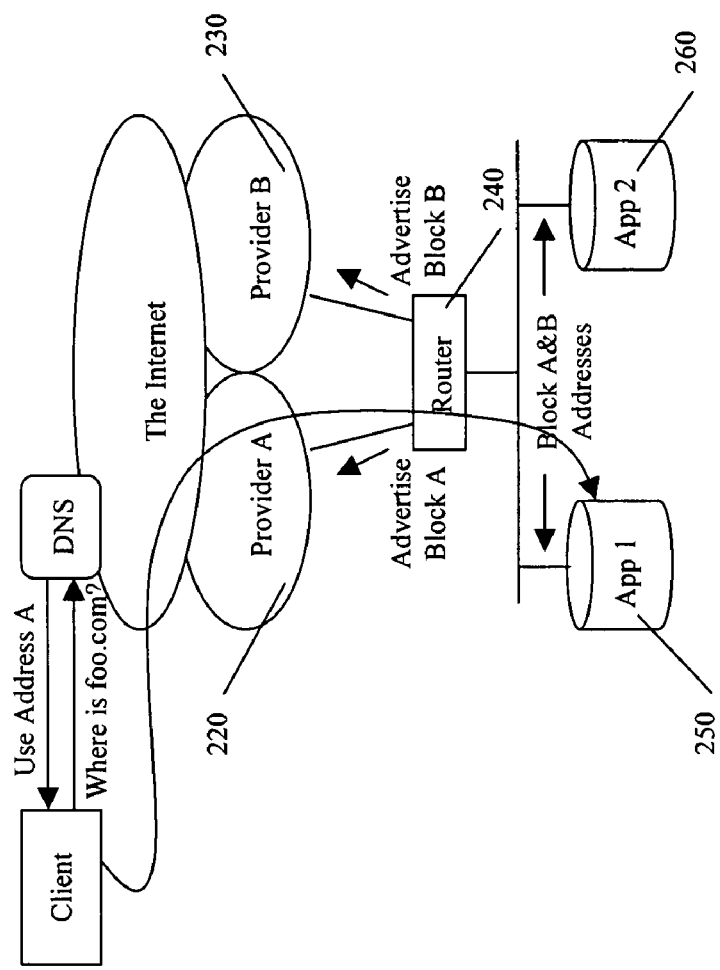
FIGS. 3A and B depict the route control for the general dynamic DNS configuration shown in FIG. 2, in accordance with an embodiment of the present invention.
Figure 3B:
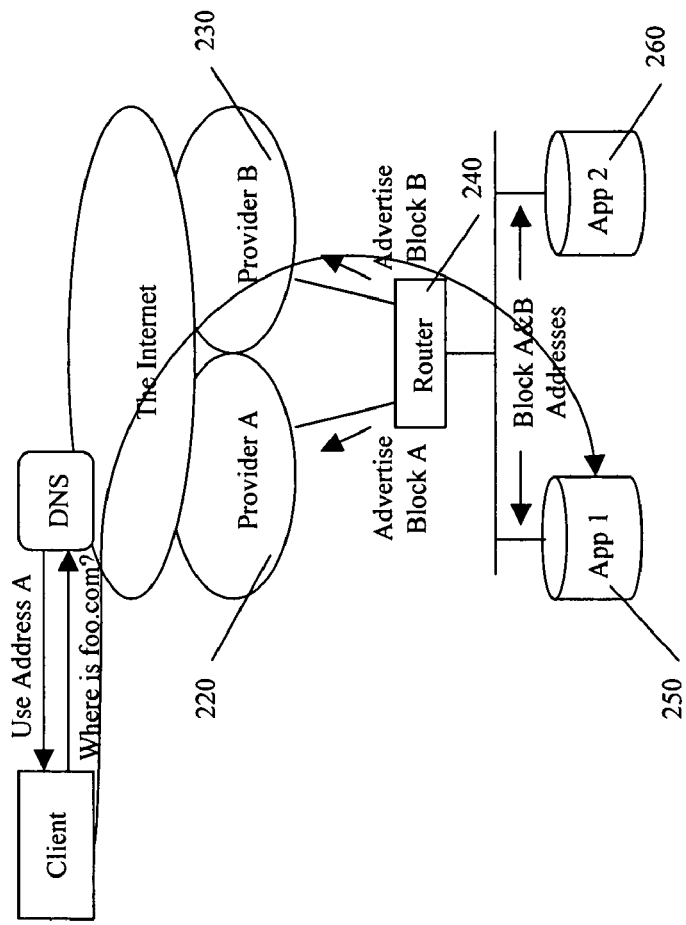

FIG. 2 illustrates the general dynamic DNS configuration for a multi-homed business or enterprise in accordance with the embodiments of the present invention. As shown in the figure, the multi-homed enterprise has split the allocated /19 address space for its web site and applications into two /20s. Each /20 address space is advertised out one of the two providers 220 and 230 as shown. When an external client wants to access the content at the web site as illustrated in FIG. 3A, the DNS delivers the client an IP address from one of the two IP address blocks, in this case from the IP address block advertised out provider A 220. The request is routed to that IP address and arrives at the site, inbound from provider A and via router 240 to access, e.g., application 250. If provider A, or some intermediate provider on the path to provider A, experiences a performance problem, the problem can be avoided by the DNS dynamically resolving the name to an IP address from block B and instead passes that address on to the client. Then all subsequent client transactions will arrive at the side inbound from provider B and via router 240 to access the application 250, as shown in FIG. 3B. Likewise, if the load on provider A is exceeding minimum cost thresholds, as determined by the data network controller, subsequent requests can be sent to provider B. Thus, FIGS. 3A-B shows how using multiple IP addresses and a dynamic DNS can provide inbound routing alternatives for the multi-homed business.

Figure 4:
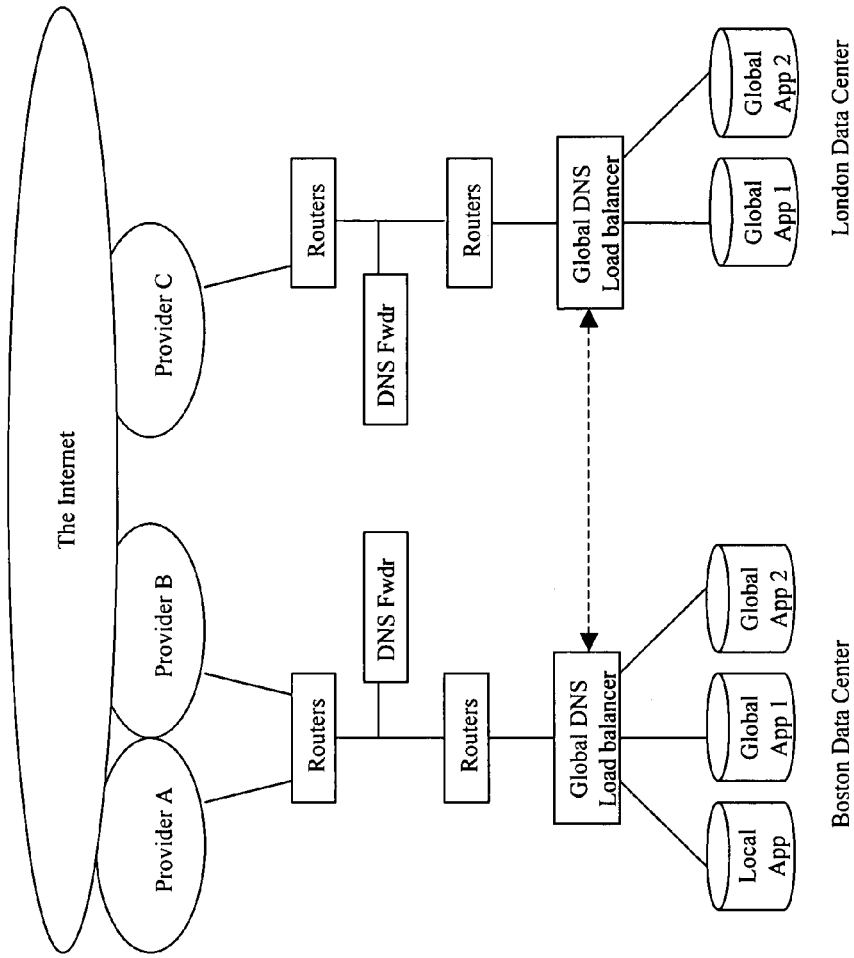
FIG. 4 depicts a detailed DNS configuration that involves several existing DNS applications or components such as caching DNS forwarders and load balancers, over multiple geographically separate sites in accordance with an embodiment of the present invention.

FIG. 4 illustrates an expansion of the DNS configuration shown in FIG. 2 to include several of the aforementioned existing DNS applications or components such as caching DNS forwarders and load balancers. According to an embodiment of the present invention, it is in the environment shown in FIG. 4 that a dynamic DNS architecture for inbound control is implemented to return dynamic IP addresses which affect the inbound path selected by a client. The architecture relies on the route control techniques embodied in a Flow Control Platform (FCP) embedded in the Internet (or any other data network used) to provide an optimal inbound decision, i.e., to determine the appropriate inbound provider for a given client or L-DNS server request.

Figure 5:
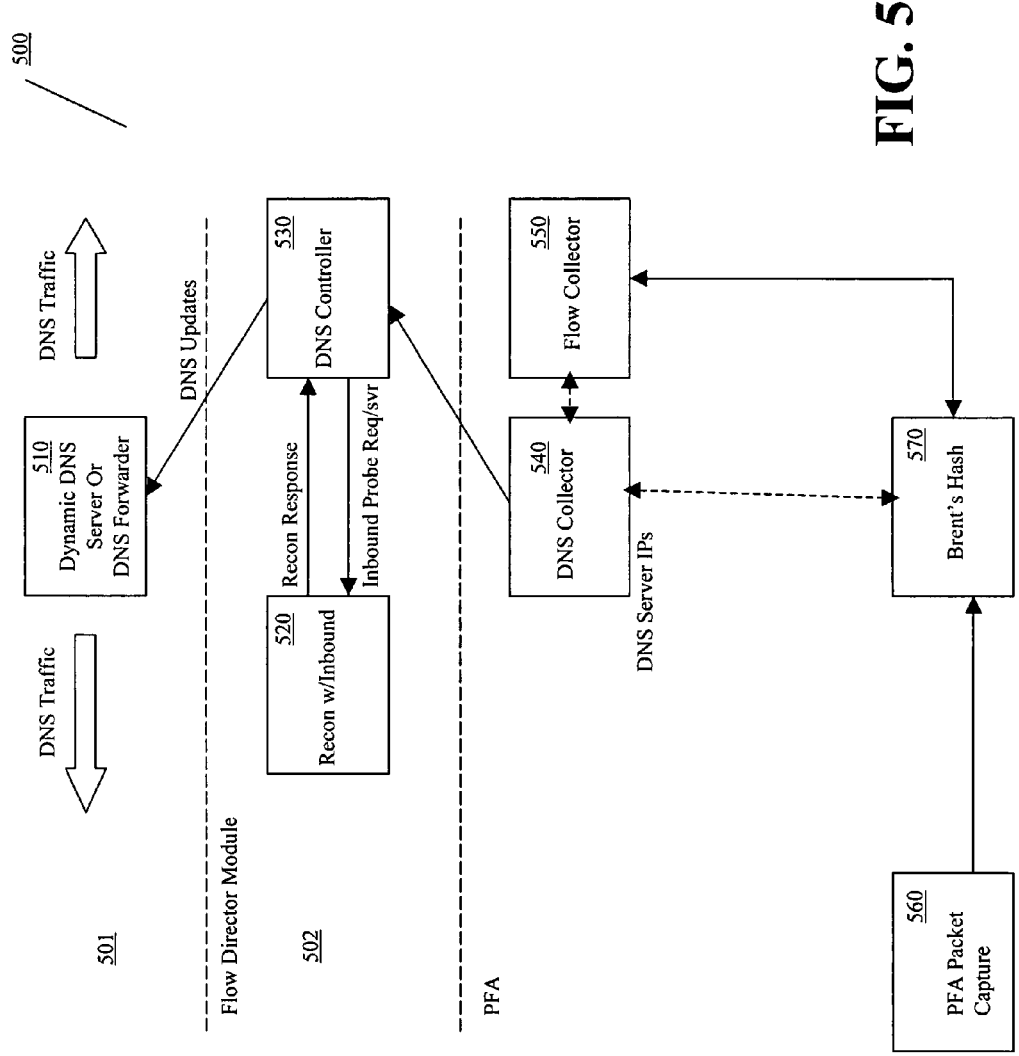
FIG. 5 depicts an FCP architecture designed to make the correct inbound decisions and communicate those decisions to a dynamic DNS component in accordance with an embodiment of the present invention.
Figure 5:
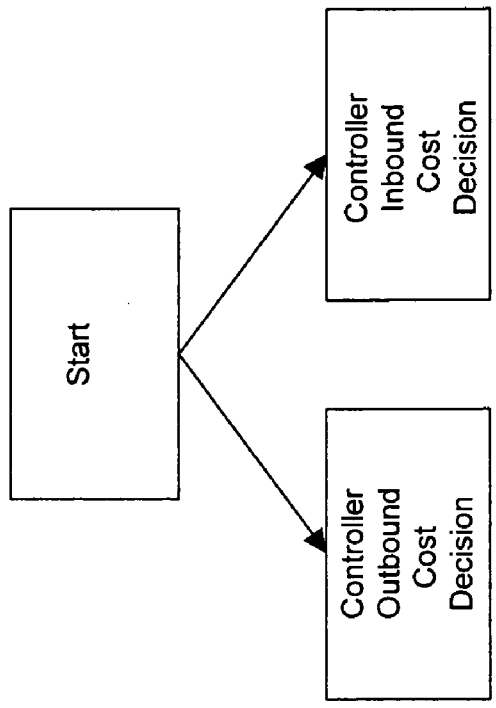

FIG. 5 illustrates an FCP architecture 500 designed to make the correct inbound decisions and communicate those decisions to a dynamic DNS component (to be discussed later) in accordance with an embodiment of the present invention. Thus, the FCP is designed to detect new DNS queries, establish and measure inbound performance related to those queries, and then communicate the proper inbound provider to which the incoming DNS requests should be resolved. Within the FCP architecture, there is provided a Passive Flow Analyzer (PFA), as described in U.S. patent application Ser. Nos. 09/833,219 and 10/735,589, which are herein incorporated by reference.

FIG. 5 shows some of the FCP components related to the PFA as described in the aforementioned applications. They are the DNS collector software module 540, the flow collector module 550, the PFA packet capture software module 560, and the current data structure for storing flow information shown as the Brent's hash software module 580 though embodiments are not limited to that particular hash as any data structure for storing flow information could be used. The PFA packet capture module 560 is used to capture all traffic flow (including real traffic, application traffic, e-mail traffic, as well as DNS traffic, etc.) of the site. The Brent's hash module 570 or similar comprises a data structure that stores information of all the flows captured by the PFA packet capture module 560. In the embodiment shown in FIG. 5, the PFA is modified to discover new DNS queries and L-DNS servers by allowing the PFA to filter specifically on the DNS traffic collected by the Brent's hash module 570 by filtering flows matching the User Datagram Protocol (UDP) port 53, which is the well known port and protocol used to receive all DNS traffic. The DNS collector module 540 as such is used to collect the set of all L-DNS servers that have been filtered through the Brent's hash module 570. Alternatively, in some embodiments of the PFA, information in this data structure is stored at the flow level (including protocol and port information), and DNS traffic flow information can be collected directly from the flow collector module 550 as well as from the Brent's hash module 570 by selecting the flows matching UDP port 53, and such collection is sent to the DNS collector module 540. Other embodiments will filter DNS traffic and servers in the XFA module (not shown) of the DNS controller.

Thus, the PFA is modified to collect and separate from all other traffic the set of L-DNS servers and IP addresses involved in the resolving of domain names. This is a natural extension of the application based filtering methods supported in the embodiments of the PFA previously disclosed in U.S. patent application Ser. Nos. 09/833,219 and 10/735,589.

Accordingly, from the DNS traffic, the set of all L-DNS servers is obtained and communicated to the DNS controller 530 in the flow director software module 502. The logic of the DNS controller 530 is an extension of the data network controller algorithms described in U.S. patent application Ser. No. 10/286,576, which is also herein incorporated by reference in its entirety. The algorithms are extended to include inbound decision logic as well as the outbound logic discussed in the aforementioned application Ser. No. 10/286, 576. The DNS control module 530 is responsible for taking information about the set of all observed L-DNS servers from the DNS collector 540 and making the best inbound selection for each of the observed L-DNS servers. Thus, the necessary inbound performance from these servers is measured. Since the nature of the DNS communication itself prohibits these measurements from being made passively (they are UDP and therefore connectionless), they must be collected using other means such as active or passive by association (described later). The module responsible for active measurement is the Recon module 520, also known as active calibrator, which is modified to enable inbound measurements. Inbound measurements can be collected using an IP address that is advertised out each of the providers and sending active measurements probes, i.e., inbound Recon probes, using those source IP addresses out the default path. The returning measurements will differ only in the performance that was experienced on the return path, and from these measurements a relative assessment of the available inbound paths can be made. This assessment, as well as the marshalling of requests themselves, is performed by the DNS controller 530, which then associates a particular inbound with each observed DNS server. These relationships are then communicated to the dynamic DNS component 510 for use in resolving future DNS queries, i.e., in honoring new DNS requests seen at the dynamic DNS server or forwarder 510.

The FCP architecture 500 assumes the simple assumptive association between clients and L-DNS servers. That is, the assumption that inbound performance optimization from the L-DNS server corresponds to an inbound performance optimization from the clients themselves. Using the simple assumptive association allows inbound control decisions based solely on the active measurements to the L-DNS servers.

According to the present invention, the FCP architecture can be implemented by a computer-readable storage medium and computer-readable transmission medium executing computer instructions. Embodiments of computer-readable storage medium and computer-readable transmission medium include, but are not limited to, an electronic, optical, magnetic, or other storage or transmission device capable of providing computer-readable instructions to a processor. Other examples of suitable computer-readable storage medium include, but are not limited to, a floppy disk, CD-ROM, DVD, magnetic disk, memory chip, ROM, RAM, an ASIC, a configured processor, all optical media, all magnetic tape or other magnetic media, or any other medium from which a processor can read instructions. Also, various other forms of computer-readable transmission media may transmit or carry instructions to a computer, including a router, switch, private or public network, or other transmission device or channel, both wired and wireless. The instructions and software modules described herein may comprise code from any-computer-programming language, including, for example, C, C++, C#.

Figures 2, 5:
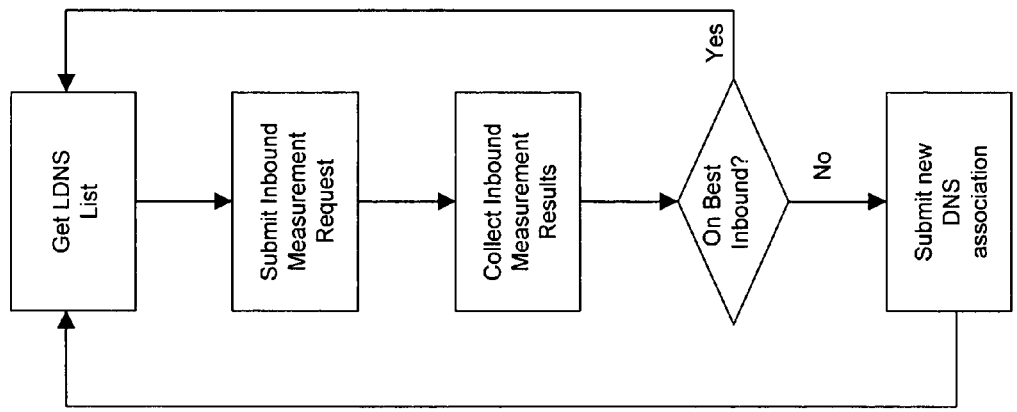
Figures 3, 5:
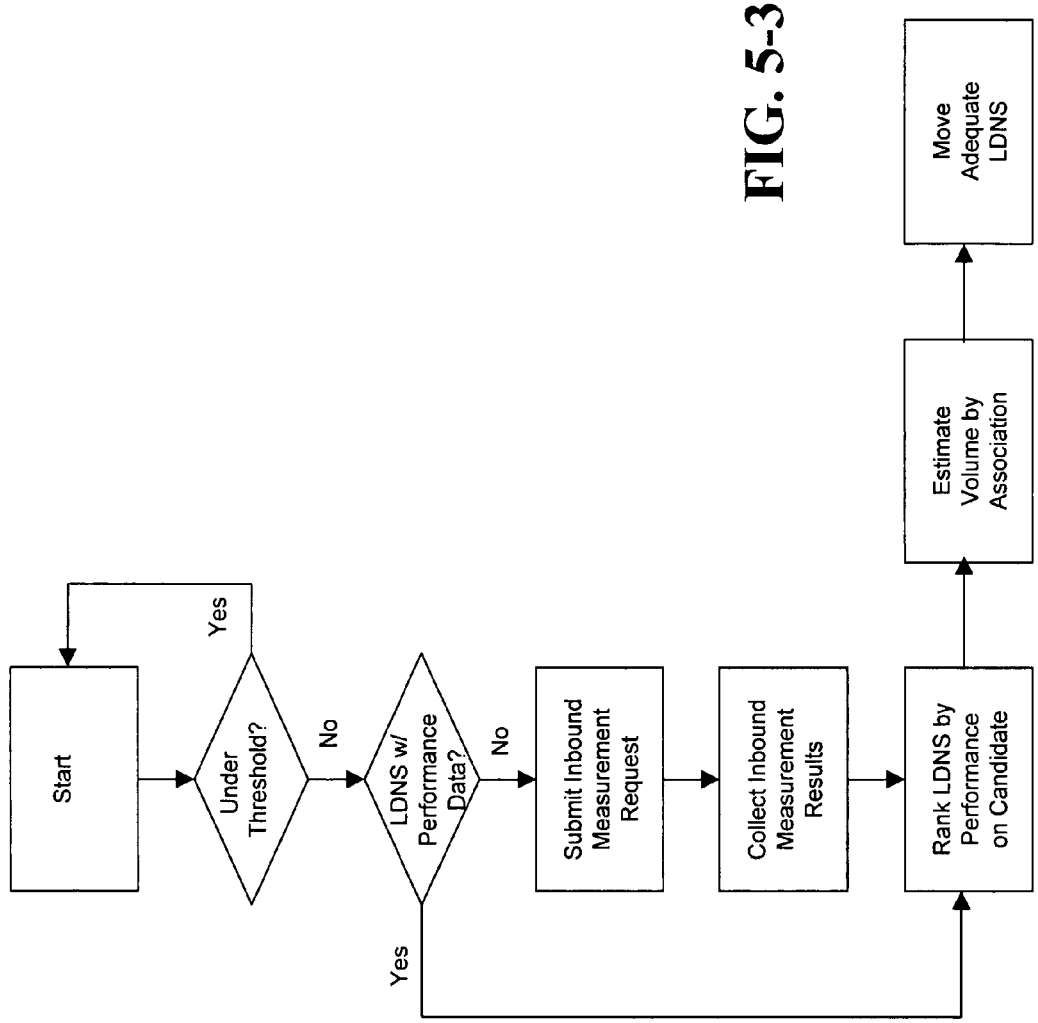
Figures 4, 5:
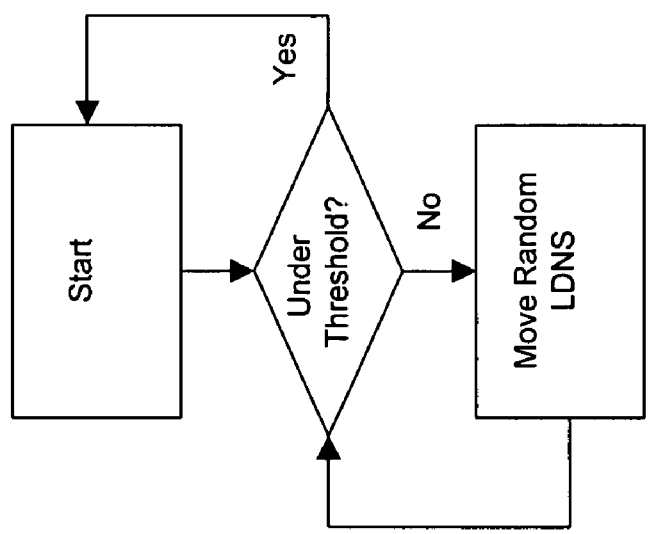
Figure 5:
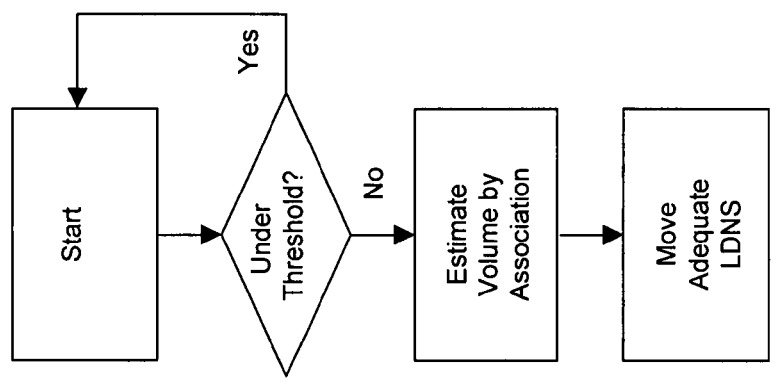

Inbound decisions can be made for performance or cost reasons as in the data network controller in U.S. patent application Ser. No. 10/286,756. One embodiment of the extended controller 530 is shown in FIG. 5-1 where the normal outbound decision trees for both cost and performance are augmented with equal inbound decision trees for both cost and performance. An example of a performance-based decision flow for inbound control is shown in FIG. 5-2. For each L-DNS discovered, i.e. observed, associated inbound performance measurements are requested and collected and a determination is made as to whether the L-DNS server is currently on the best performing path, and if not, an inbound change request is issued to the Dynamic DNS Server or DNS Forwarder 510 of FIG. 5 setting the appropriate inbound path. An example of an inbound-cost decision flow is shown in FIG. 5-3. This decision is run for each provider and if the provider in question is currently over the threshold, as previously determined by the controller, the process finds the correct set of L-DNS servers to move away from the provider. In order to ensure that performance is not significantly degraded, performance data must be available for the decision to be made. If performance data is already available, the decision can move to make an immediate selection. Otherwise, additional inbound performance data must be requested and collected in order to make the selection. When performance data is available, the L-DNS can be ranked by associated performance on the candidate providers and the associated client volume for each L-DNS server is observed from the Association Table. From this information the controller determines which and how many of the L-DNS servers to move and submits inbound change requests to implement the decisions.

In the above discussion, the Association Table plays a crucial role in determining how many and specifically which L-DNS should be moved to alleviate the usage threshold violations. Associations help bind each L-DNS with a set of client IP addresses or prefixes. These are useful for ongoing performance measurements (both active and passive) as well as understanding the relevant client volume that is associated with a particular L-DNS. With this information, the system can know, a priori how much traffic will move when changing the inbound path for a particular L-DNS. Additionally, this association helps the controller effectively measure the performance of the path from the clients as well as from the L-DNS as the client prefix itself is measured instead of the L-DNS itself. This is more accurate as the client is the destination that should be optimized for the best experience, not the L-DNS server.

The discussion thus far has been for one particular association, the assumptive association. This association simply states that the performance to or from the L-DNS server will be the same as the clients that use the L-DNS server. In some instances, it is not possible to associate the client volume with the assumptive association, and therefore, most cost moves will be blind as to the volume of traffic that will shift with each L-DNS inbound change. Thus, assumptive associations may limit the invention to less sophisticated traffic engineering modes for cost moves as shown in FIG. 5-4. Here the decision for a move is not predicated on either the performance of the candidate paths or the amount of volume that each move will shift. Instead the process is iterative until enough traffic has been shifted to relieve the threshold. However, if a simple association for volume/L-DNS were available, the traffic engineering decision can be more sophisticated as shown in FIG. 5-5, where the system knows a priori the amount of traffic that will shift with each L-DNS move.

Thus the need for more definitive client to L-DNS associations exists. Inside the Controller process a data structure is built that contains any and all L-DNS to client prefix associations. Then these prefix can be used to reference other flow information already stored in the prefix table of the Controller process. The prefix table is used to store volume and performance information for all know prefix in the system. Performance information is generally both candidate provider as well as default provider performance to the destination prefix. This table of information is the basis for all of the decisions, cost and performance, made by the controller. The key difference for inbound route control solutions is the need to expand the performance section to include inbound as well as outbound provider metrics. To collect such information the active calibrator, recon, generates active measurements for all provider combinations inbound and outbound. An example of these data structures is found in FIG. 5-6 which illustrates the architecture of a controller using BGP association. The controller process has a new data structure called the association table and it contains the address of the L-DNS server and all prefix that have been associated with the L-DNS. Additionally, the prefix table is expanded to include performance information for inbound and outbound provider selections.

Figures 5, 6:
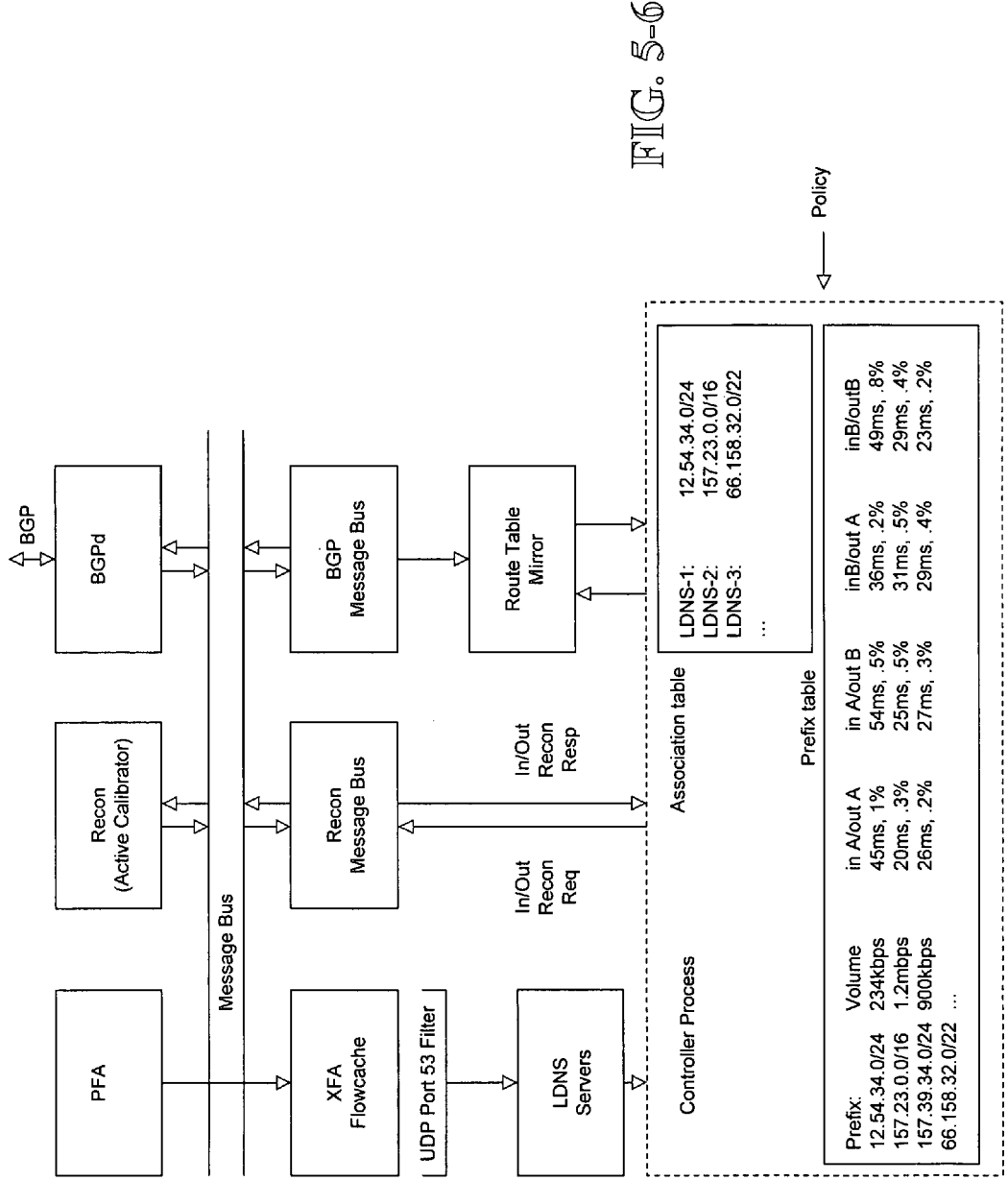
Figures 5, 6, 7:
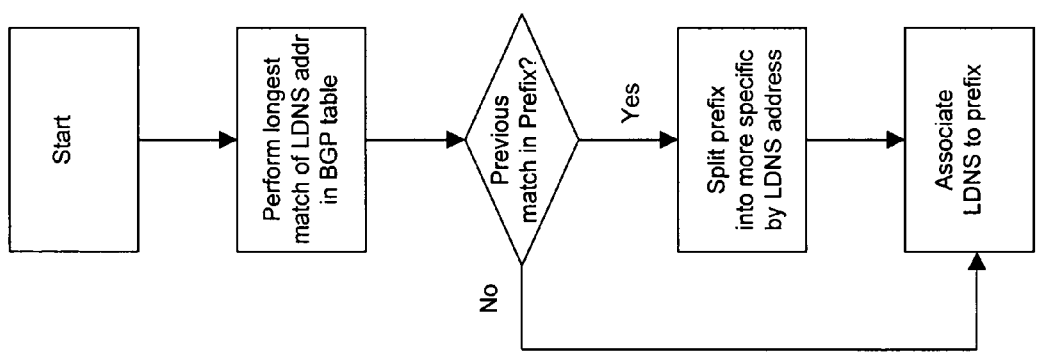

For BGP based associations, the routing table is used as the primary association mechanism. When a new L-DNS server is observed, the controller performs a longest match lookup in the routing table and simply associates that prefix with the L-DNS in the association table. This tends to over-associate many more client addresses with the L-DNS than generally use the L-DNS. This is because some of the prefix in the BGP table are quite large and realistically would not be served by a single DNS server. To help refine these associations over time, the decision shown in FIG. 5-7 is used. When multiple L-DNS match the same prefix (as will happen when the prefix is large) the prefix is de-aggregated into smaller prefix relative to the L-DNS addresses. For example if two L-DNS match the same /16 prefix, one may match the top half of the prefix (the upper /17) and other L-DNS matches the lower half, then the /16 in the BGP table is split up into two /17s in the association table, one for each L-DNS. This allows the accuracy of the association table to improve over time as new L-DNS are discovered.

Another association is one that experimentally associates real client traffic with the L-DNS used by the client. The architecture for the controller in this embodiment is shown in FIG. 5-8. When a new L-DNS is observed, the DNS responds with a special "discovery" IP address that can be used to tag subsequent client traffic as being associated with the L-DNS. This embodiment requires tight coordination between the DNS server, Controller, and the PFA as all are required to make this association effective. The decision for a "discovery" association is shown in FIG. 5-9. When the new L-DNS is observed, the DNS server issues the discovery address. This may require that the DNS server communicate with the Controller in order to access the current association table to coordinate the initial need for the discovery address in the first place and also to inform the Controller to install a filter on the XFA to identify all traffic matching the discovery address. Any client traffic that matches the filter is built into a binary tree the parent of which is the appropriate prefix length for the L-DNS association.

Another embodiment of associations is to use the scan points, discussed in U.S. patent application Ser. No. 10/735,589, U.S. provisional Application No. 60/433,285 entitled "TOPOLOGY-BASED ROUTE CONTROL OVER DATA NETWORKS USING CONVERGENCE" and the U.S. utility patent application that claims priority to such provisional application, as both measurement proxies and associations. In the scan point embodiment, many external elements in the wide area network have identified certain infrastructure points that represent the performance to specific areas (prefix and autonomous systems) of the network. This data is communicated as a scan point feed to the controller and is used predominantly for measurement proxies. However as shown in FIG. 5-10, this scan point feed can be used for associations as well. In a method similar to the BGP associations, when a new L-DNS is seen, a longest match in the scan point table determines the appropriate association to be stored in the association table. The decision for such an embodiment is shown in FIG. 5-11.

FIG. 6 shows a dynamic DNS configuration where the FCP 605 communicates the aforementioned inbound updates to an advanced DNS name server 601, i.e., the dynamic DNS component, that responds to DNS requests accordingly. Again as are shown in FIGS. 2 and 3, the local IP address space in FIG. 6 has been split and advertised out the respective providers. Routing and addressing has been established that allows a request from either block to reach the appropriate applications. The FCP 605, with all of the detection mechanisms (both active and passive) as described earlier, determines the appropriate, i.e., optimal, inbound service provider based on the IP address of the L-DNS server making the request and communicates these "DNS announcements" to the advanced DNS name server 601 as shown. "Optimal" is according to the user policy around network performance (e.g., loss, latency, jitter, etc.), link load, and provider cost. Best performance and lowest cost are typical policies. This policy mechanism is in accordance with other embodiments of route control and is described in U.S. patent application Ser. No. 10/735,589, which is herein incorporated by reference in its entirety.

FIG. 7 illustrates an implementation of the advanced DNS name server 601 in accordance with an embodiment of the present invention. With the "DNS announcements" information the advanced DNS name server 601 can create a table which associates a L-DNS server with an appropriate zone file (the zone file is the name to address database normally used by DNS implementations). In the embodiment shown, zone files 740 and 750 can be built for Block A and Block B, respectively. Each zone file is configured in the advanced DNS name server 601, which employs the DNS process 720 performs a first order zone lookup from a DNS table 730 based on the L-DNS IP address that is making the access request to determine which zone file to use. In the absences of explicit information from the FCP 605, the default behavior can be one of a few settings, typically round robin to evenly distribute load. In the event of a widespread performance problem on one of the ISPs 620 or 630, the default setting for an unknown L-DNS can be set by the FCP 605 to a specific inbound for the duration of the outage, thus preventing round robin decisions from using a degraded ISP. When the dynamic DNS name server 601 responds to a DNS request, it honors and responds with the inbound IP address that has been selected by the FCP 605. The subsequent transaction is routed to the application via the appropriate inbound ISP 620 or 630 based on the selected inbound IP address. According to an embodiment of the present invention, the advanced DNS name server 601 itself has IP multiple addresses, each reachable from the an associated provider and configured as a secondary DNS name server in the DNS infrastructure. This allows the advanced DNS name server 601 to receive a DNS request even in the event of 100% packet loss on the primary IP address over the primary or default provider. In such a scenario, the advanced DNS name server 601 can immediately recognize that a significant performance problem is occurring on the primary/default provider and react accordingly.

Figures 5, 6, 7, 8:
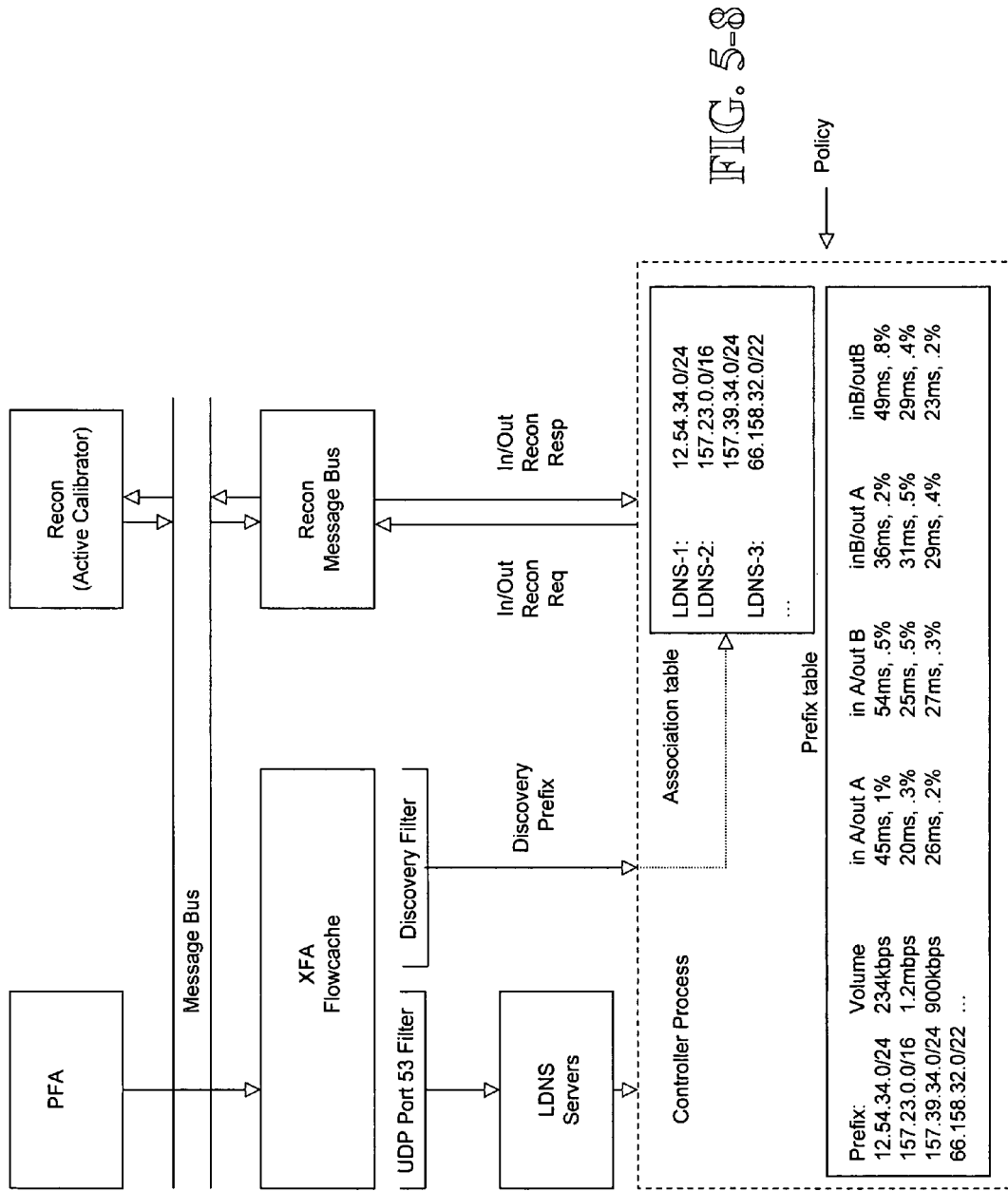

Accordingly, FIG. 6 illustrates how the FCP 605 can be integrated with a new DNS capability, namely, the advanced DNS name server 601, to implement inbound routing decisions, and FIG. 7 shows an implementation of this advanced integration. While the dynamic DNS configuration shown in FIGS. 6 and 7 may be sufficient for some of the smaller business sites that rely on a single DNS configuration, it does not easily support many of the advanced DNS features (e.g. global load balancing) common in larger deployments. However, the advanced DNS name server shown in FIG. 7 can be expanded to support all of the feature sets in most deployments, or designed to honor or at least augment existing DNS applications or decisions. FIG. 8 shows a dynamic DNS configuration that uses a modified caching forwarder 850 to support a larger business site. As discussed earlier, a typical caching forwarder is authoritative for the domain, but it simply forwards incoming DNS requests down to other DNS applications for processing. The downstream DNS resolves the name and returns the IP address to the forwarder, which caches the result and passes it along to the originating L-DNS server. In the embodiment shown, the normal caching forwarder is modified and shown as DNS forwarder 850 to change on a selective basis the outgoing IP address while leaving other responses intact, thus preserving features like global load balancing, but enabling inbound route control for the local IP addresses.

In the embodiment shown, a global content site has two data centers, one in Boston and one in London. Both sites have Global DNS load balancers 860 which communicate with each other to determine server load at each data center as well as other parameters. The load balancers are configured with a virtual IP (vip) for each of the applications. In addition, to support inbound route control a redundant vip from (or advertised out) each ISP or service provider 810, 820, and 830 is configured per application. Incoming requests to any of the vips will reach the correct application. In this embodiment, the FCP 840 is installed in the normal manner and communicates to a modified DNS forwarder 850 as shown. The DNS forwarder is authoritative for both data centers, but is configured with the IP address of the DNS load balancer 860 of the local data center, namely, the Boston Data Center in this case. Incoming requests will be forwarded on to the load balancer 860 and the load balancer 860 will respond back to the DNS forwarder 850. If the request is for a local application, the load balancer responds with the vip of the local application servers. If the request is for a global application, the load balancers 860 determine which site (based on load, proximity, etc.) should receive the request and then respond with either the vip configured on the Boston load balancer or the vip configured on the London load balancer.

Figures 5, 6, 7, 8, 9:
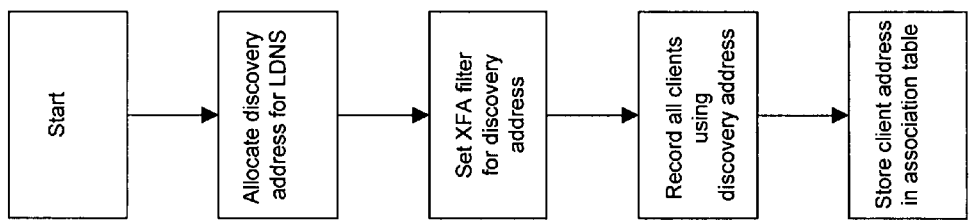

When these responses are returned to the DNS forwarder 850, the forwarder has the opportunity to perform inbound route control. If the IP address is a local one (for the local application or the local IP address of the global application), the DNS forwarder 850 can substitute any of the vips for that application based on the performance or load of the inbound ISP relative to the user policy. If the IP address is a remote IP address, the forwarder sends the response without modification to the originating L-DNS. This process is illustrated in FIG. 9, where a request for the local application is received and a response returned that will force the transaction inbound on provider B even though the load balancer returns the vip for provider A. The same optimization can be performed for the global application, but only if the load balancers respond with an IP address from the local facility, in this case vip A or vip B for the global application.

Figures 5, 6, 7, 8, 9, 10:
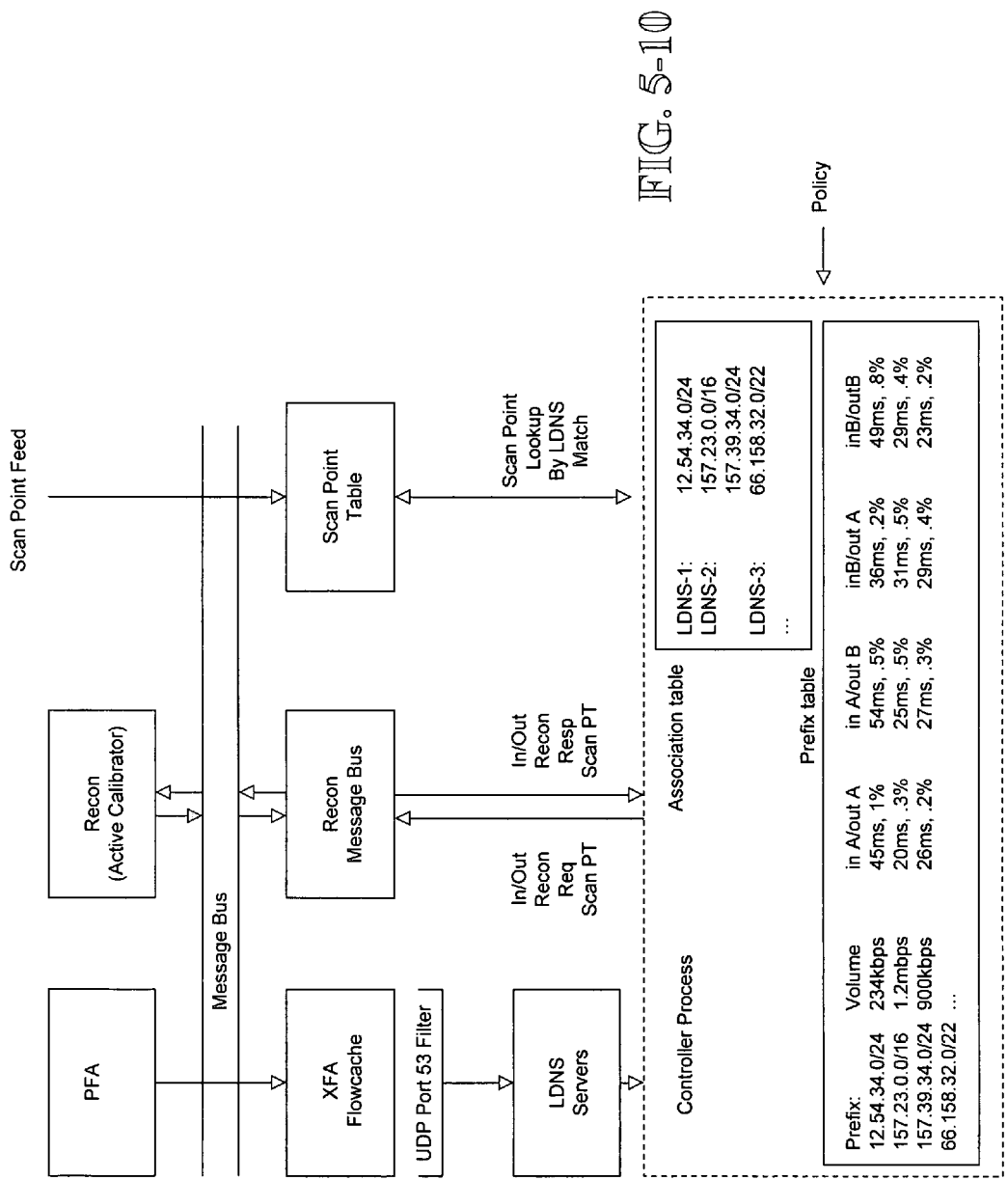

FIG. 10 shows a request for the global application that, because of server load in Boston, resolves to the London facility. In this case the IP address returned by the load balancer (vip C) 1060 is not altered by the DNS forwarder 950 because the IP address is not local. When the client receives the response, the request is initiated to the London servers as shown.

According to embodiments of the present invention, the modified DNS forwarder maintains the relationship not only among the L-DNS to inbound, but also among the set of local (and therefore malleable) IP addresses. The lookups on the response first involve matching any local IP address (from all local zones perhaps) and then doing a second lookup based on the originating L-DNS to determine which local inbound to translate it to. The third potential lookup translates the original IP address with the optimal IP address, or simply uses the initial IP address record cross-reference to the optimal zone file. An exemplary architecture for a dynamic DNS forwarder is shown in FIG. 11, in accordance with one embodiment of the present invention, which illustrates the necessary functions that a dynamic DNS forwarder must accomplish.

Figures 5, 6, 7, 8, 9, 10, 11:
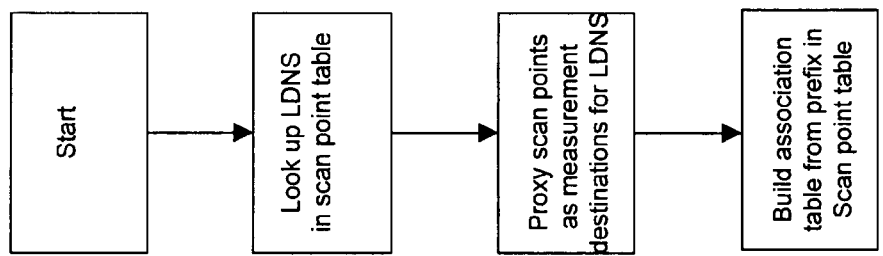
Figure 6:
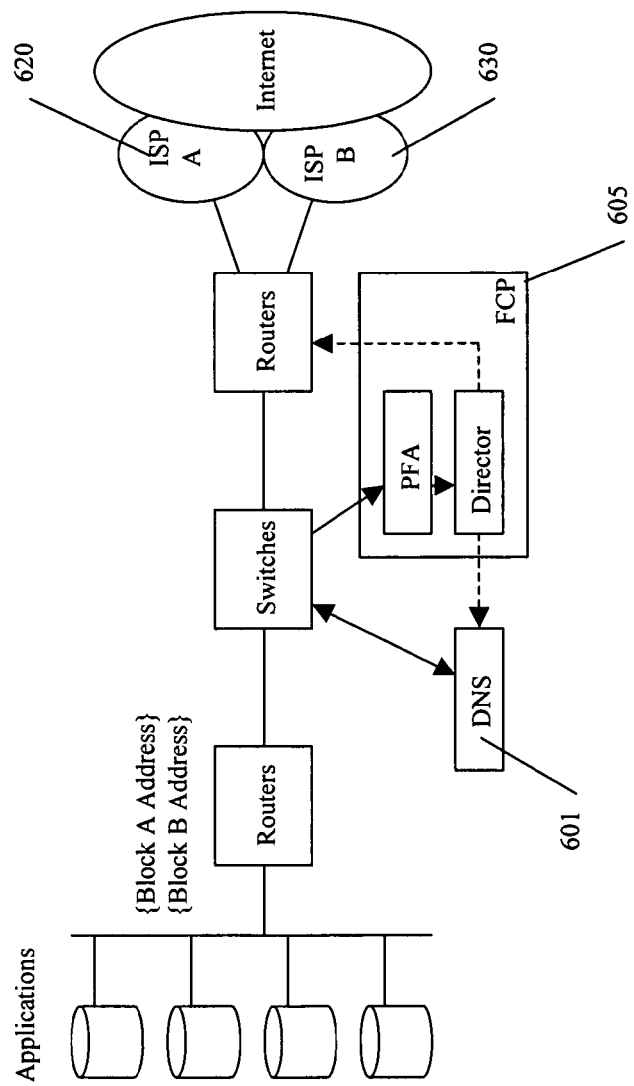
Figure 7:
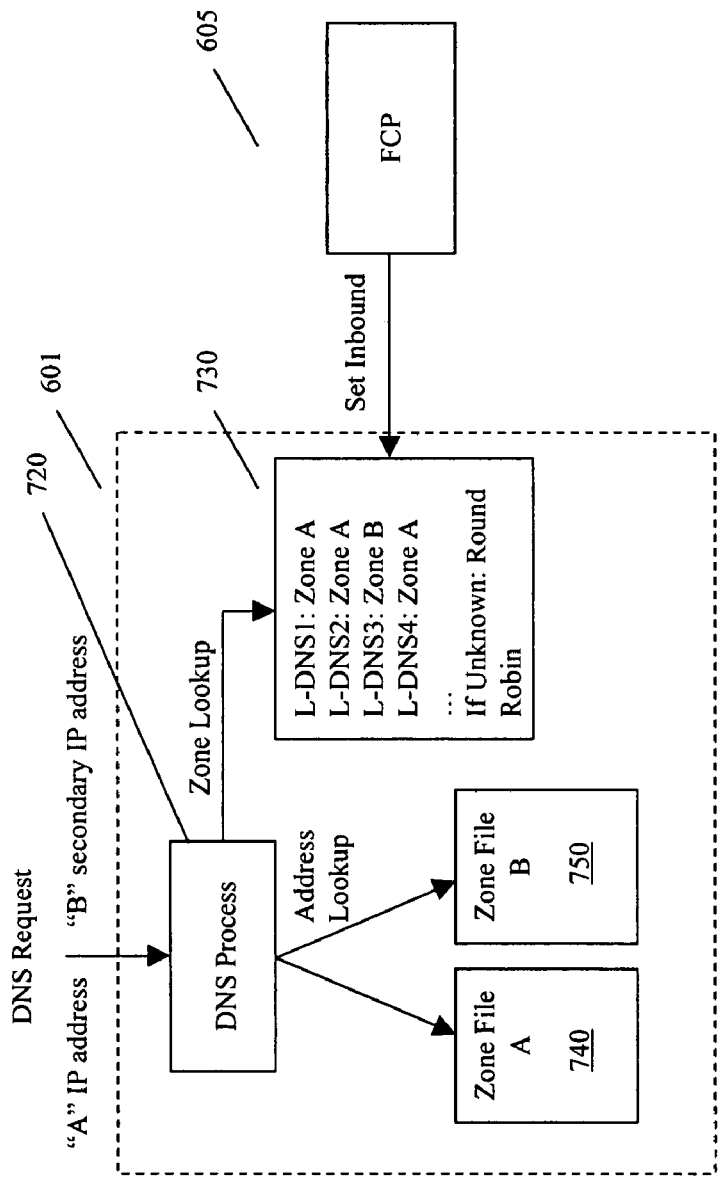
Figure 8:
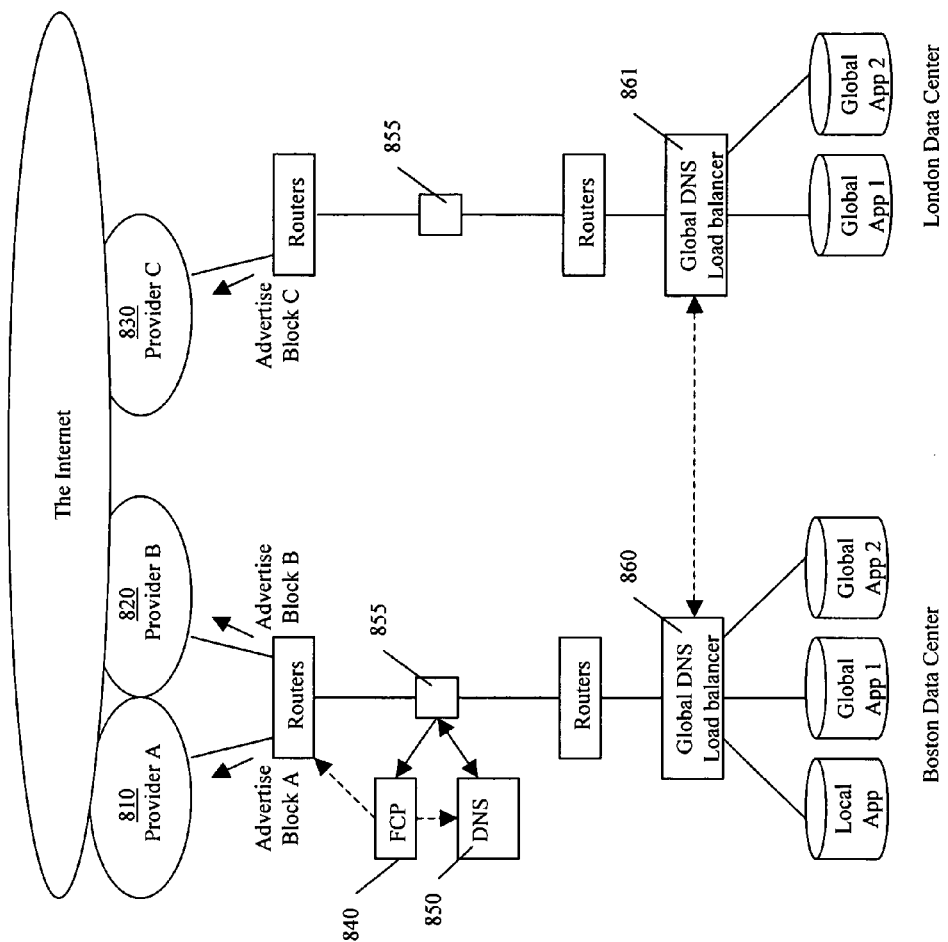
Figure 9:
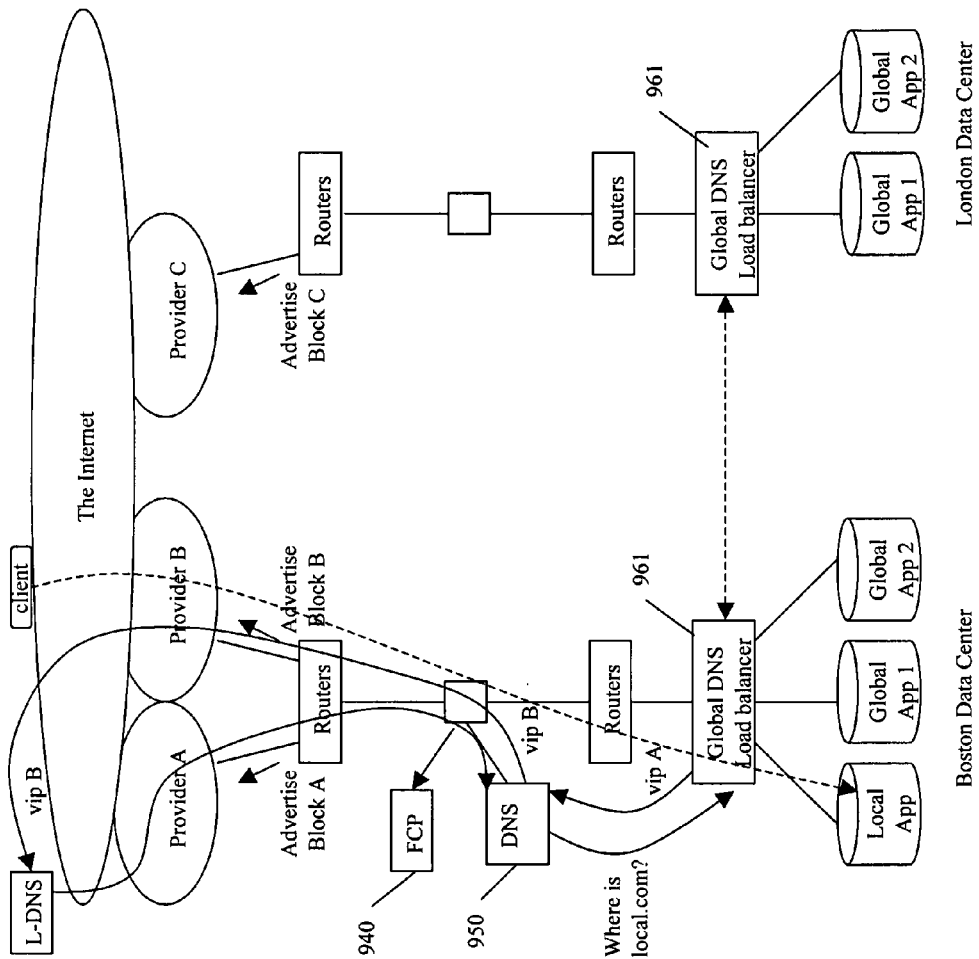
Figure 10:
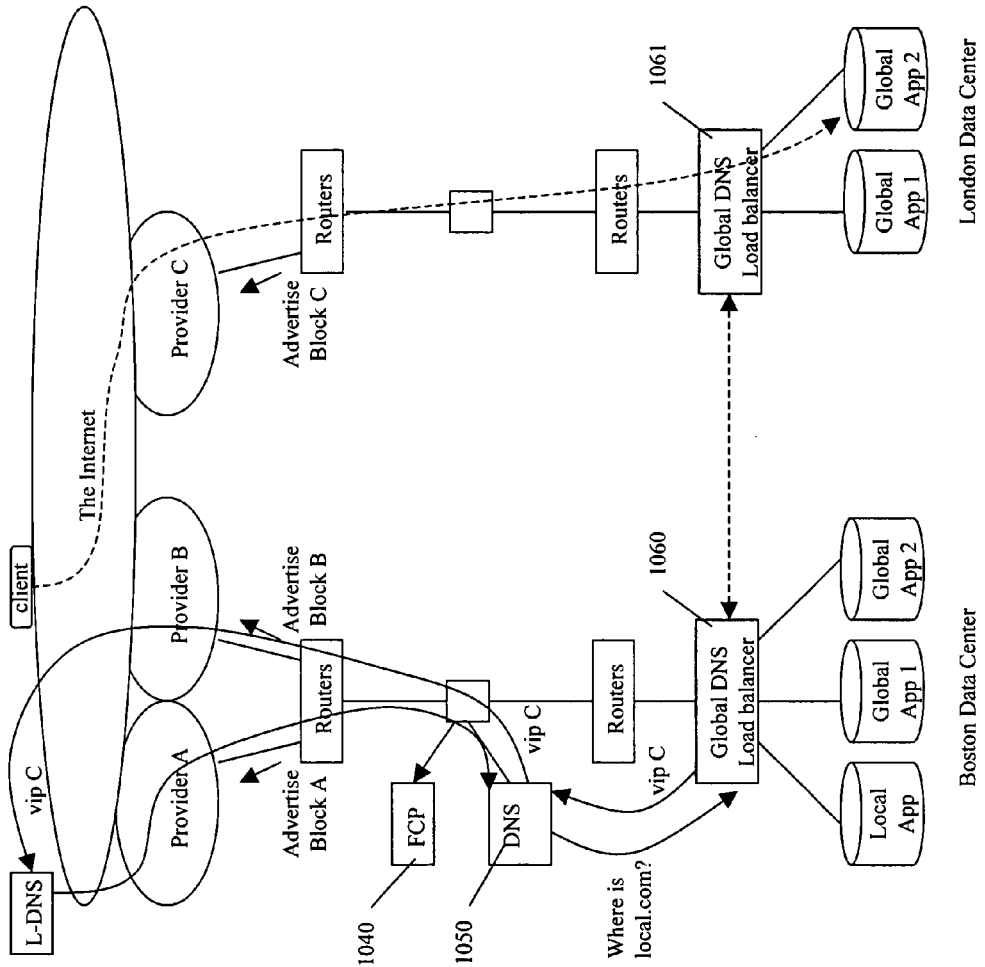
Figure 11:
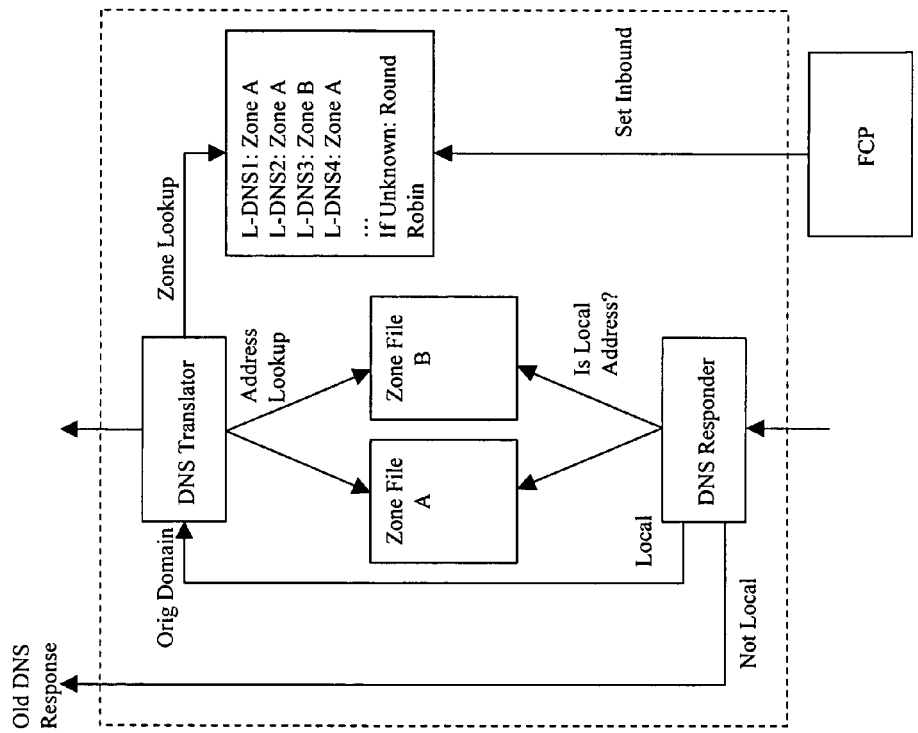

Functions not shown in FIG. 11 include a caching operation, where the response is cached if desired. However, generally the lifetime of both the load balancing and inbound control is short, which may alleviate the need to develop any type of caching. These functions need not be implemented in a separate piece of hardware, but can reside directly on the same hardware platform running the DNS services. The forwarder can then listen on a different IP address and forward to another local IP address, with easy access to the local zone files.

Figure 12:
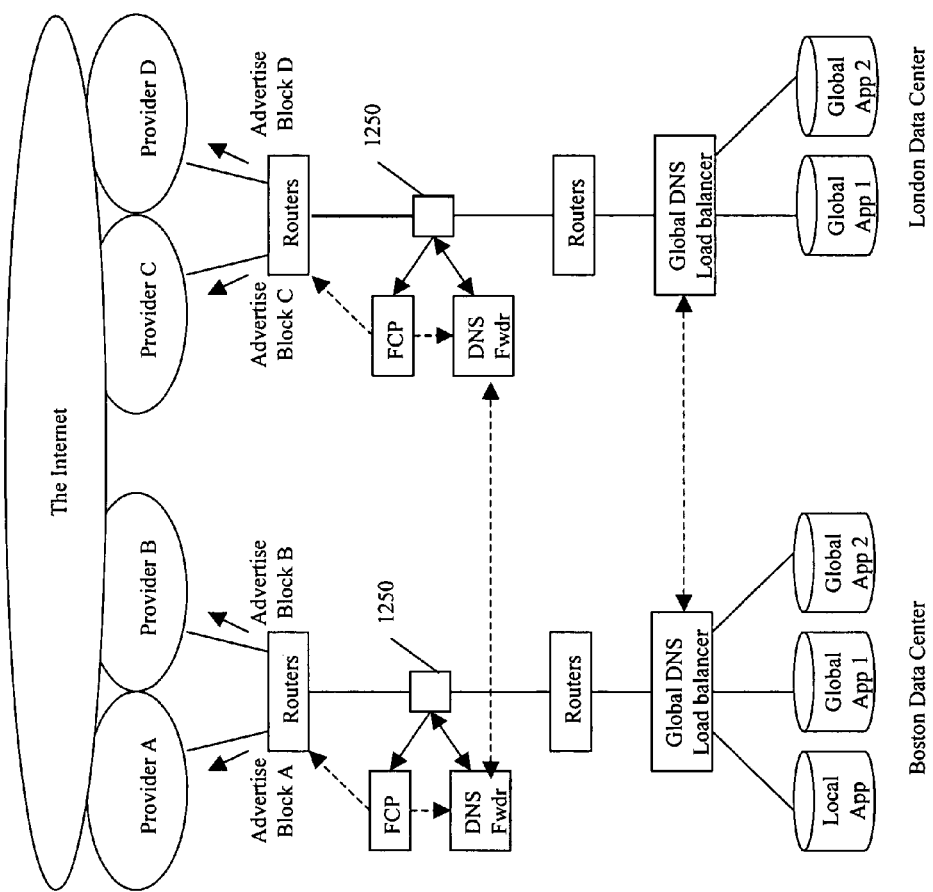
FIG. 12 depicts a dynamic DNS configuration for global inbound route control of multiple global sites that are multi-homed.

According to another embodiment of the present invention, a global inbound route control is possible for multiple global sites that are multi-homed, as shown in FIG. 12. In this embodiment, the DNS forwarders 1250 can communicate with each other in the same way as the global load balancers do to optimize inbound selections for sites that are not local. In such configuration, each forwarder 1250 does not require any lookups to determine if the IP address is a local one, instead a locally optimized decision is made and communicated globally. However, the requirement now includes access to all of the available zone files grouped by site. For instance, the first IP address lookup (vip c for example) indicates the site is London which has two zone files available (C and D). There is a unique L-DNS to zone association for each of the global sites. In this way, decisions made in Boston for London can enjoy the same inbound optimization by selecting among Provider C or Provider D as indicated by the London FCP.

Consequently, dynamic DNS for inbound control offers a route control solution to the large enterprise which relies on externally initiated transaction. Inbound performance problems can be detected and resolved for clients externally initiating connections. Additionally, inbound provider load can be balanced or filled according to the least provider cost. These solutions are transparent to existing DNS configurations and enable the business site to enjoy true end-to-end performance and cost or load optimization for these externally initiated transactions.

Although the invention has been described with reference to these embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A method for dynamically selecting a route in a data network to an application, wherein the application is available at a plurality of distinct network locations, each of the network locations served by at least one network service provider and a first one of the network locations served by a plurality of service providers, comprising:
   receiving an access request for the application;
   determining a virtual IP address for the application that is associated with one of the network service providers based upon load data for each of the network locations;
   if the virtual IP address corresponds to the first network location, then analyzing performance data for a path through each of the network service providers serving the first network location; and
   based on the performance data, selecting a path through a selected one of the network service providers serving the first network location;
   if the virtual IP address is associated with the selected network service provider, then providing the virtual IP address in response to the access request; and
   if the virtual IP address is not associated with the selected service provider, then providing an IP address that is associated with the selected service provider in response to the access request.

2. The method of claim 1, wherein analyzing performance data for a path through each of the network service providers serving the first network location comprises:
   analyzing performance data for paths associated with a local name server that sent the access request.

3. The method of claim 1, wherein analyzing performance data for a path through each of the network service providers serving the at least one network location comprises:
   analyzing performance data for paths associated with an address prefix associated with a client that originated the access request.

4. The method of claim 1, wherein the performance data includes load data.

5. The method of claim 1, further comprising:
   if the virtual IP address corresponds to another one of the network locations, then selecting the network service provider associated with the virtual IP as the selected network service provider.

6. The method of claim 1, wherein another one of the network locations is served by a plurality of service providers, further comprising:
   if the virtual IP address corresponds to the other network location, then analyzing performance data for a path through each of the network service providers serving the other network location; and
   based on the performance data, selecting a path through a selected one of the network service providers serving the other network location.

7. A computer-readable storage medium, having computer-executable instructions stored therein for carrying out the following steps:
   receiving an access request for an application wherein the application is available at a plurality of distinct network locations, each of the network locations served by at least one network service provider and a first one of the network locations served by a plurality of service providers;
   determining a virtual IP address for the application that is associated with one of the network service providers based upon load data for each of the network locations;
   if the virtual IP address corresponds to the first network location, then
      analyzing performance data for a path through each of the network service providers serving the first network location;
      based on the performance data, selecting a path through a selected one of the network service providers serving the first network location; and
      providing an IP address that is associated with the selected service provider in response to the access request; and
   if the virtual IP address corresponds to another one of the network locations, then providing the virtual IP address in response to the access request.

8. The computer-readable storage medium of claim 7, wherein analyzing performance data for a path through each of the network service providers serving the first network location comprises:
   analyzing performance data for paths associated with a local name server that sent the access request.

9. The computer-readable storage medium of claim 7, wherein analyzing performance data for a path through each of the network service providers serving the at least one network location comprises:
   analyzing performance data for paths associated with an address prefix associated with a client that originated the access request.

10. The computer-readable storage medium of claim 7, wherein the performance data includes load data.

11. A system for dynamically selecting a route in a data network to an application, comprising:
    a plurality of distinct network locations, wherein the application is available at each of the network locations;
    a plurality of network service providers, wherein a first network location is served by a first set of network service providers;
    a plurality of load balancers, each load balancer associated with one of the network locations, wherein each load balancer monitors a load of its associated network location and communicates load information to the other load balancers and wherein a first load balancer is associated with the first network location;
    a plurality of name server forwarders, each name server forwarder associated with a load balancer, wherein each name server forwarder requests address information from its associated load balancer and communicates with the other name server forwarders and wherein a first name server forwarder is associated with the first load balancer; and
    a plurality of flow control platforms (FCPs), each FCP associated with a name server forwarder, wherein each FCP collects performance data for paths through the network service providers serving its associated network location and communicates the performance data to its associated name server forwarder and wherein a first FCP is associated with the first name server forwarder;

wherein the first name server forwarder responds to an access request for the application by requesting address information from the first load balancer, determines whether the address information provided by the load balancer identifies a network service provider in the first set of the network service providers and if so, analyzes performance data from the first FCP, and provides an address that identifies a selected one of the network service providers in the first set of network service providers based on the performance data received from the FCP.

12. The system of claim 11, wherein at least one of the FCP uses active probing techniques to collect performance data for paths through the network service providers serving its associated network location.

13. The system of claim 11, further comprising a plurality of local name servers in communication with the first name server.

14. The system of claim 13, wherein the first name server includes a zone loop up table that associates a local name server with a zone file.

* * * * *